United States Patent
Rebinsky

(10) Patent No.: US 9,995,616 B2
(45) Date of Patent: Jun. 12, 2018

(54) FLUID LEVEL MONITORING SYSTEM

(71) Applicant: Caterpillar Inc., Peoria, IL (US)

(72) Inventor: Douglas A. Rebinsky, Peoria, IL (US)

(73) Assignee: Caterpillar Inc., Deerfield, IL (US)

( * ) Notice: Subject to any disclaimer, the term of this patent is extended or adjusted under 35 U.S.C. 154(b) by 29 days.

(21) Appl. No.: 15/141,317

(22) Filed: Apr. 28, 2016

(65) Prior Publication Data

US 2017/0314983 A1 Nov. 2, 2017

(51) Int. Cl.
*G01F 23/26* (2006.01)
*B62D 55/21* (2006.01)
*B62D 55/092* (2006.01)
*B62D 55/08* (2006.01)

(52) U.S. Cl.
CPC ............ *G01F 23/263* (2013.01); *B62D 55/08* (2013.01); *B62D 55/092* (2013.01); *B62D 55/21* (2013.01)

(58) Field of Classification Search
CPC ....... G01F 23/263; B62D 55/08; B62D 55/21; B62D 55/092
USPC .... 301/59, 117, 119; 305/15, 130, 132, 135, 305/142
See application file for complete search history.

(56) References Cited

U.S. PATENT DOCUMENTS

| | | | |
|---|---|---|---|
| 4,140,015 A * | 2/1979 | Roley | G01F 23/241 340/450.3 |
| 4,209,205 A | 6/1980 | Gregg et al. | |
| 4,575,914 A | 3/1986 | Armida et al. | |
| 4,924,702 A * | 5/1990 | Park | G01F 23/268 324/690 |
| 5,576,925 A | 11/1996 | Gorowitz et al. | |
| 6,490,920 B1 | 12/2002 | Netzer | |
| 8,281,656 B2 | 10/2012 | Schnidrig | |
| 8,590,375 B2 | 11/2013 | Farmanyan | |
| 9,120,514 B2 | 9/2015 | Kile | |
| 9,222,822 B2 * | 12/2015 | Sinha | G01F 23/263 |
| 9,261,395 B2 * | 2/2016 | Shearer | G01F 23/268 |
| 2005/0172712 A1 * | 8/2005 | Nyce | G01F 23/263 73/304 C |
| 2015/0045727 A1 | 2/2015 | Bammer et al. | |

OTHER PUBLICATIONS

K. Chetpattananondh et. al., A self-calibration water level measurement using an interdigital capacitive sensor, Journal (homepage: www.elsevier.com/locate/sna), Sensors and Actuators A 209 (2014) 175-182, (a) Department of Electrical Engineering, Faculty of Engineering, Prince of Songkla University, Hat Yai 90110, Songkhla, Thailand (b) ThailandbMobillis Automata Co., Ltd., 50/136 Moo 7, Klong 2, Klong Luang 12120, Pathumthani, Thailand.

* cited by examiner

*Primary Examiner* — S. Joseph Morano
*Assistant Examiner* — Jean Charleston

(57) ABSTRACT

A fluid level monitoring system for a container defining a chamber includes first and second flexible interdigital capacitive sensors located at first and second ends of the chamber and disposed about a longitudinal axis of the chamber. The first and second flexible interdigital capacitive sensors are configured to be immersed, at least in part, within a fluid contained in the chamber. The fluid level monitoring system further includes a controller disposed in operative communication with the first and second flexible interdigital capacitive sensors, to determine a level of the fluid in the chamber based, at least in part, on an average of measure of parameters received from the first and second flexible interdigital capacitive sensors.

13 Claims, 5 Drawing Sheets

FLUID LEVEL MONITORING SYSTEM

TECHNICAL FIELD

The present disclosure relates to a fluid level monitoring system. More particularly, the present disclosure relates to monitoring oil level in track joint assemblies of track-type machines.

BACKGROUND

Track-type machines are in widespread use in construction, mining, forestry, and other similar industries. The undercarriage of such track-type machines utilizes track assemblies, rather than wheels, to provide ground-engaging propulsion. Such track-type machines utilize one or more track assemblies that include an endless loop of coupled track links defining outer surfaces, which support ground-engaging track shoes, and inner surfaces that travel about one or more rotatable track-engaging elements, such as, for example, drive sprockets, idlers, tensioners, and rollers.

Track link assemblies generally include a number of bushings and entrained track links. The bushings and track links cooperate to form a number of track joints. Typical track designs include a track pin, either rotatably engaged or fixed to a pair of track chain assemblies, and a bushing rotatably positioned between the track chain assemblies. The track pin includes a cavity to keep a lubricant such as oil within the track joint to ensure smooth relative movement of the bushings and the track pin. A sealing assembly is placed in the track joint to retain lubricant within the track joint. However, once the sealing assembly starts wearing out, the lubricant leaks out of the joint.

Therefore, it is an important aspect of the undercarriage track joint validation to monitor the amount of oil in the track joint. Presently, two techniques are used for measurement of oil level. One technique uses pressure reduction to an applied gas pressure to calculate the empty volume and the other method uses dipstick. Both methods require the stopper/sealing assembly to be pushed inside the oil cavity hole of the pin resulting in the need for a new seal/stopper after the measurement is taken. Each time the measurements are taken, this process is repeated. Also, such techniques require removing the whole track from the vehicle, which is very time consuming, cumbersome and cost-inefficient for user.

Hence, there is a need for techniques that measure the amount of oil inside the track joints without disassembling the unit. Further, there is a need for transmitting the data from the measurement location efficiently and using that information for product health information.

SUMMARY OF THE DISCLOSURE

In an aspect of the present disclosure, a fluid level monitoring system for a container defining a chamber is provided, the chamber having first and second ends located distally from one another. The fluid level monitoring system includes a first flexible interdigital capacitive sensor located at the first end of the chamber and disposed about a longitudinal axis of the chamber, and a second flexible interdigital capacitive sensor located at the second end of the chamber and disposed about the longitudinal axis of the chamber, wherein the first and second flexible interdigital capacitive sensors are configured to be immersed, at least in part, within a fluid contained in the chamber. The fluid level monitoring system further includes a controller disposed in operative communication with the first and second flexible interdigital capacitive sensors, the controller being configured to determine a level of the fluid in the chamber based, at least in part, on an average of measure of parameters received from the first and second flexible interdigital capacitive sensors.

In another aspect of the present disclosure, a method of monitoring a level of fluid in a chamber having first and second ends located distally from one another is provided. The method includes positioning a first flexible interdigital capacitive sensor at the first end of the chamber and disposing the first flexible interdigital capacitive sensor about a longitudinal axis of the chamber. The method further includes positioning a second flexible interdigital capacitive sensor at the second end of the chamber and disposing the second flexible interdigital capacitive sensor about the longitudinal axis of the chamber. The method furthermore includes immersing, at least in part, each of the first and second flexible interdigital capacitive sensors within the fluid contained in the chamber. The method furthermore includes determining, by a controller disposed in operative communication with the first and second flexible interdigital capacitive sensors, the level of the fluid in the chamber based, at least in part, on an average of measure of parameters received from the first and second flexible interdigital capacitive sensors.

In yet another aspect of the present disclosure, a pin of a track joint assembly having at least two links offset with one another and rotatably supported by the pin to facilitate co-operative movement of the links relative to one another is provided. The pin includes a body having an inner circumference defining a chamber therein, the chamber configured to define a first end and a second end located distally from the first end, and a fluid level monitoring system associated with the chamber. The fluid level monitoring system includes a first flexible interdigital capacitive sensor located at the first end of the chamber and disposed about a longitudinal axis of the chamber, and a second flexible interdigital capacitive sensor located at the second end of the chamber and disposed about the longitudinal axis of the chamber, wherein the first and second interdigital capacitive sensors are configured to be immersed, at least in part, within a fluid contained in the chamber. The fluid level monitoring system further includes a controller disposed in operative communication with the first and second flexible interdigital capacitive sensors. The controller is configured to determine a level of the fluid in the chamber based, at least in part, on an average of measure of parameters received from the first and second flexible interdigital capacitive sensors. Measure of the parameters received from respective ones of the first and second flexible interdigital capacitive sensors is independent of a dielectric constant associated with the fluid contained in the chamber and a tilt angle of the chamber with respect to gravity.

Other features and aspects of this disclosure will be apparent from the following description and the accompanying drawings.

DETAILED DESCRIPTION

Wherever possible, the same reference numbers will be used throughout the drawings to refer to same or like parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

Figure 1:
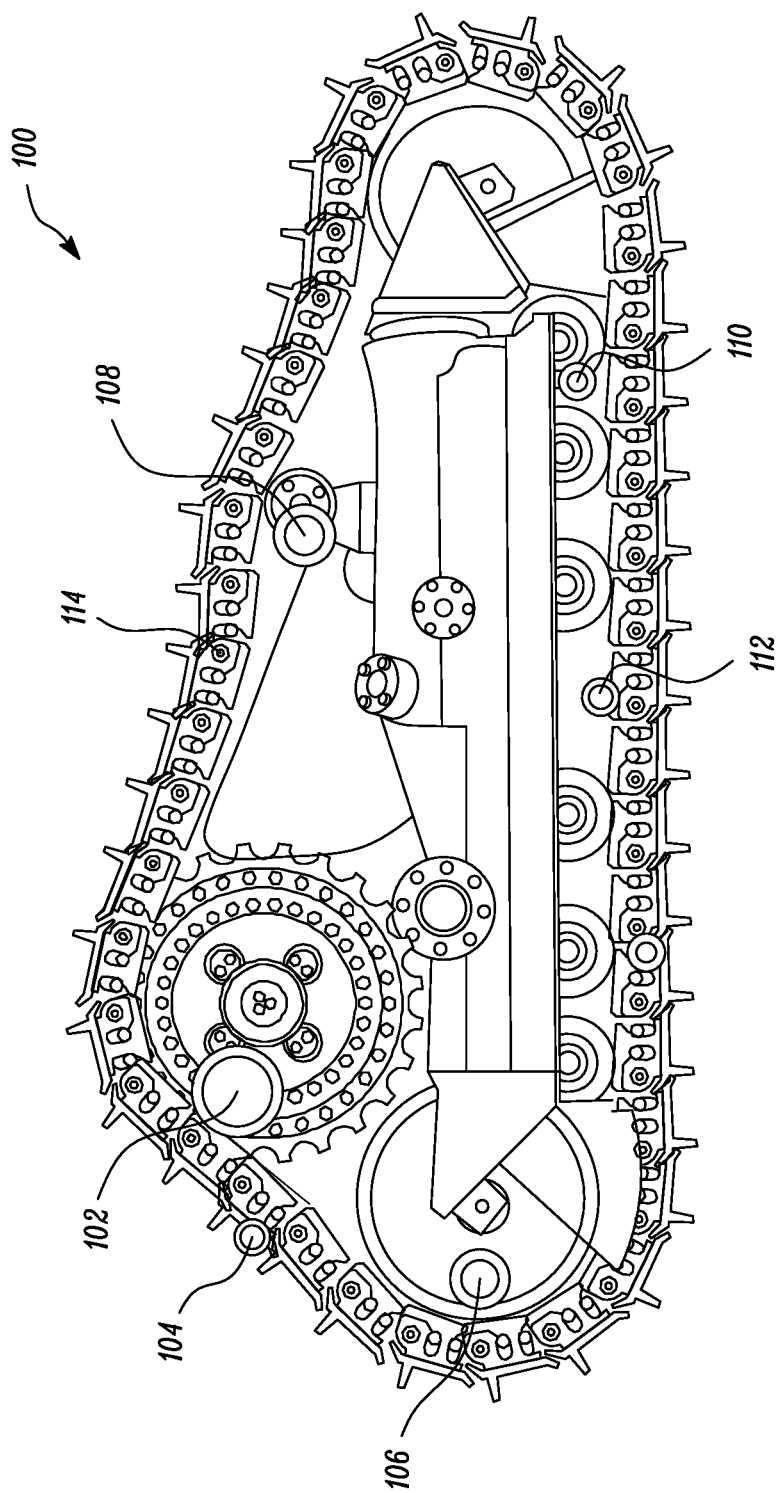
FIG. 1 shows an exemplary undercarriage of a track-type machine.

The present disclosure relates to a fluid level monitoring system for a link assembly of an undercarriage of a track-type machine. FIG. 1 shows an exemplary undercarriage 100 of a track-type machine, in which embodiments of the present disclosure can be implemented. However, it may be noted that the undercarriage 100 disclosed herein is exemplary and hence, non-limiting to this disclosure. One skilled in the art will appreciate that systems and methods disclosed herein can be similarly applied to numerous other types of vehicles without deviating from the spirit of the present disclosure.

With continued reference to FIG. 1, the undercarriage 100 includes a sprocket 102, a number of track shoes 104, an idler 106, a carrier roller 108, a number of rollers 110, a number of guards 112, and a link assembly 114. The link assembly 114 is entrained around the sprocket 102 and idler 106, and a number of track shoes 104 are attached to the link assembly 114. The sprocket 102 rotates to engage the link assembly 114, which causes the link assembly 114, along with the attached track shoes 104, to rotate around a path defined by the sprocket 102 and idler 106. The rotation of the link assembly 114 and the track shoes 104 around this path causes the track shoes 104 to engage the ground.

Figure 2:
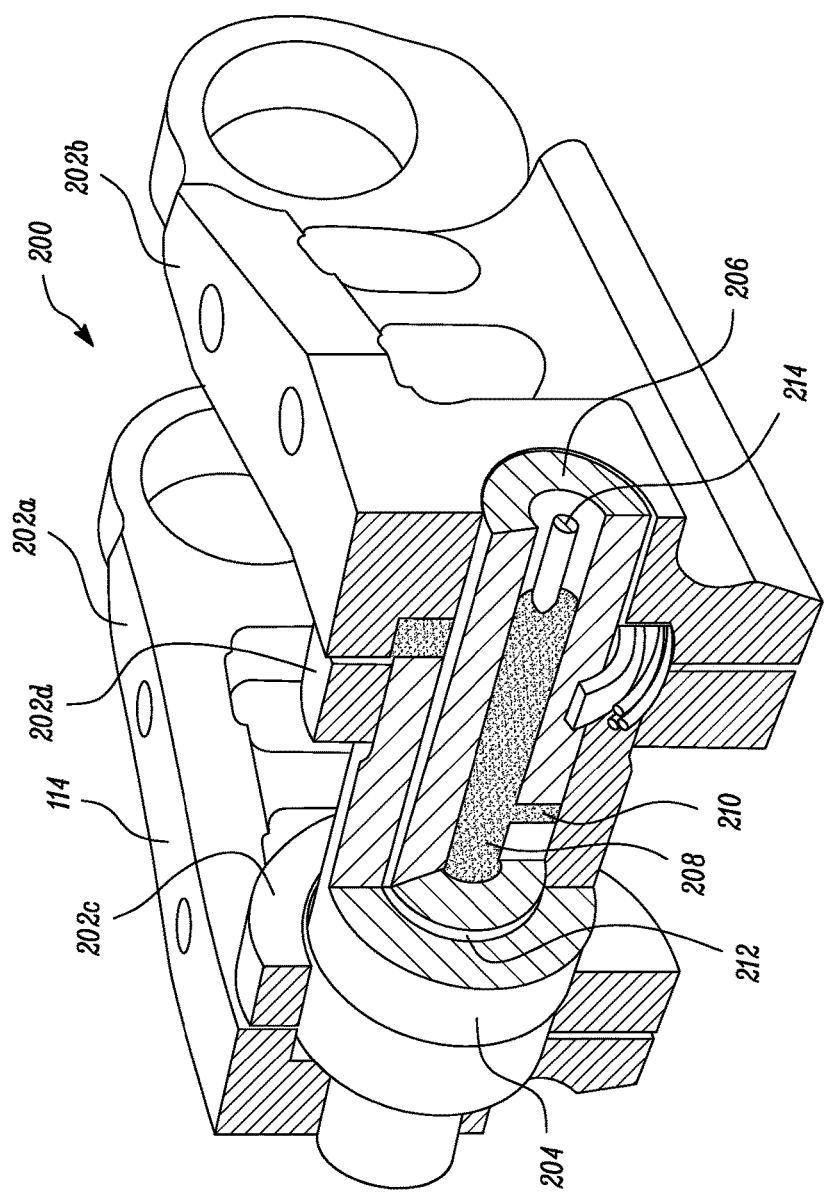
FIG. 2 is a sectional view of a link assembly of the undercarriage of FIG. 1.

Now referring to FIG. 2, there is shown a section 200 of the link assembly 114 of FIG. 1. The link assembly 114 includes links 202a, 202b, 202c and 202d (hereinafter collectively referred to as links 202) offset with one another and a cylindrically shaped bushing 204 (or simply a bushing 204) rotatable positioned between the links 202. A pin 206 contained within the bushing 204 is either rotatably engaged or fixed to a pair of links 202, and rotatably supported by the bushing 204 to facilitate co-operative movement of the links 202 relative to one another. The pin 206 holds the links 202 together and acts as a hinge with the bushing 204. The bushing 204 and the links 202 cooperate to form a track joint.

The pin 206 is center drilled from one end nearly its entire length to provide a fluid cavity 208 for storing a lubricant. The fluid cavity 208 is in fluid communication with a cross hole 210 to deliver a fluid to a space 212 between the pin 206 and the bushing 204 to provide lubrication between the contact surface of the pin 206 and the bushing 204, to ensure smooth relative movement of the bushing 204 and the pin 206. The fluid cavity 208 has a stopper 214 positioned therein for sealing the pin 206 and retaining the fluid within the track joint. The stopper 214 may be removed to replenish the supply of fluid contained in the fluid cavity 208.

Example of the fluid, may include, but is not limited to a suitable lubricant such as oil. In an example, the fluid is a thick dyed red oil, and the amount of the fluid is approximately 0-120 ml. The viscosity of the oil is 185 centistokes (cSt) at 40 degrees.

Figure 3:
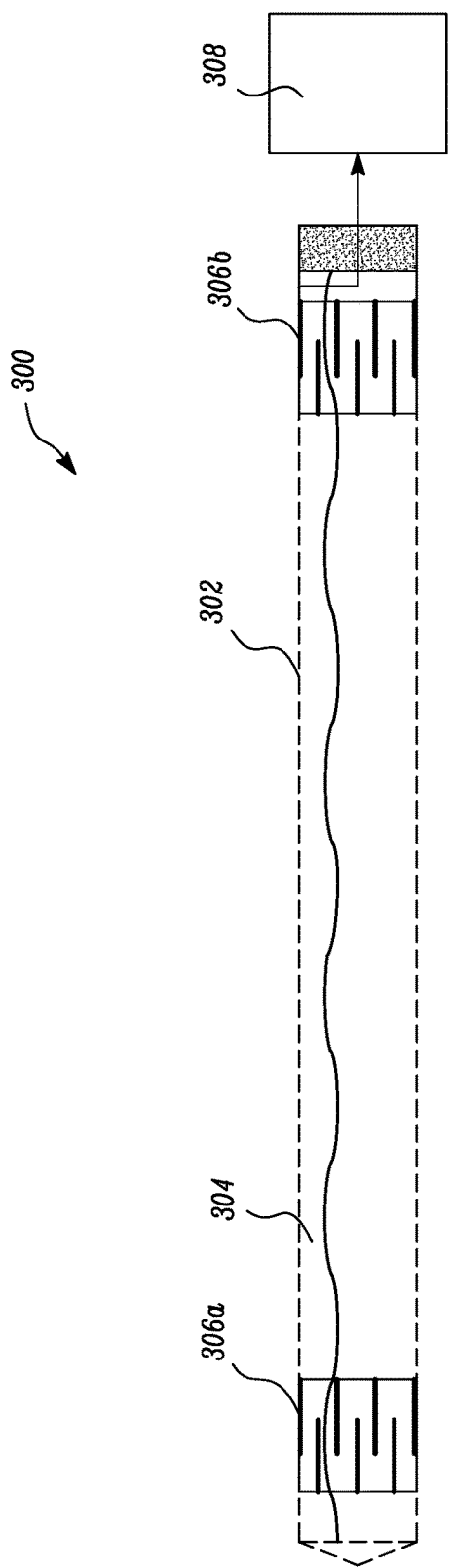
FIG. 3 is a block diagram illustrating a fluid level monitoring system associated with a pin of the link assembly, in accordance with an embodiment of the present disclosure.

FIG. 3 is a block diagram illustrating a fluid level monitoring system 300 for monitoring fluid level in a pin 302 (similar to the pin 206 of the link assembly 114), in accordance with an embodiment of the present disclosure. The pin 302 has an inner circumference defining a chamber 304 for storing a fluid such as oil. The fluid level monitoring system 300 includes first and second flexible interdigital capacitive sensors 306a and 306b located at respective ends and disposed about a longitudinal axis thereto.

Each of the flexible interdigital capacitive sensors 306a and 306b has a coplanar structure comprising multiple interpenetrating comb electrodes. When different potentials are applied on each comb electrode, the fringing fields are generated between positive and negative electrodes. These fields travel from positive to negative electrodes through the fluid contained in the chamber 304. Thus, a level of the fluid in the chamber 304 affects the capacitance and conductance between the comb electrodes. The level of the fluid in the chamber 304 also affect the discharge times of the first and the second flexible interdigital capacitive sensors 306a and 306b from a first voltage to a second voltage.

In an embodiment, first and second capacitances $C_{out1}$ and $C_{out2}$ across the first and second flexible interdigital capacitive sensors 306a and 306b, respectively is utilized for determining the level of the fluid contained in the chamber 304. The first and second capacitances $C_{out1}$ and $C_{out2}$ may be measured based on the voltage outputs of the first and second flexible interdigital capacitive sensors 306a and 306b, respectively. The first and second capacitances $C_{out1}$ and $C_{out2}$ may also be measured by the use of an analog timing circuit with a signal frequency inversely proportional to their capacitances.

In an embodiment, first and second discharge times $t_{out1}$ and $t_{out2}$ of the first and second flexible interdigital capacitive sensors 306a and 306b, respectively from a first voltage to a second voltage may be utilized for determining the level of fluid in the chamber 304. The discharge times $t_{out1}$ and $t_{out2}$ of the first and second flexible interdigital capacitive sensors 306a and 306b may be determined by using a suitable RC circuit with each of the first and second flexible interdigital capacitive sensors 306a and 306b.

Figure 4:
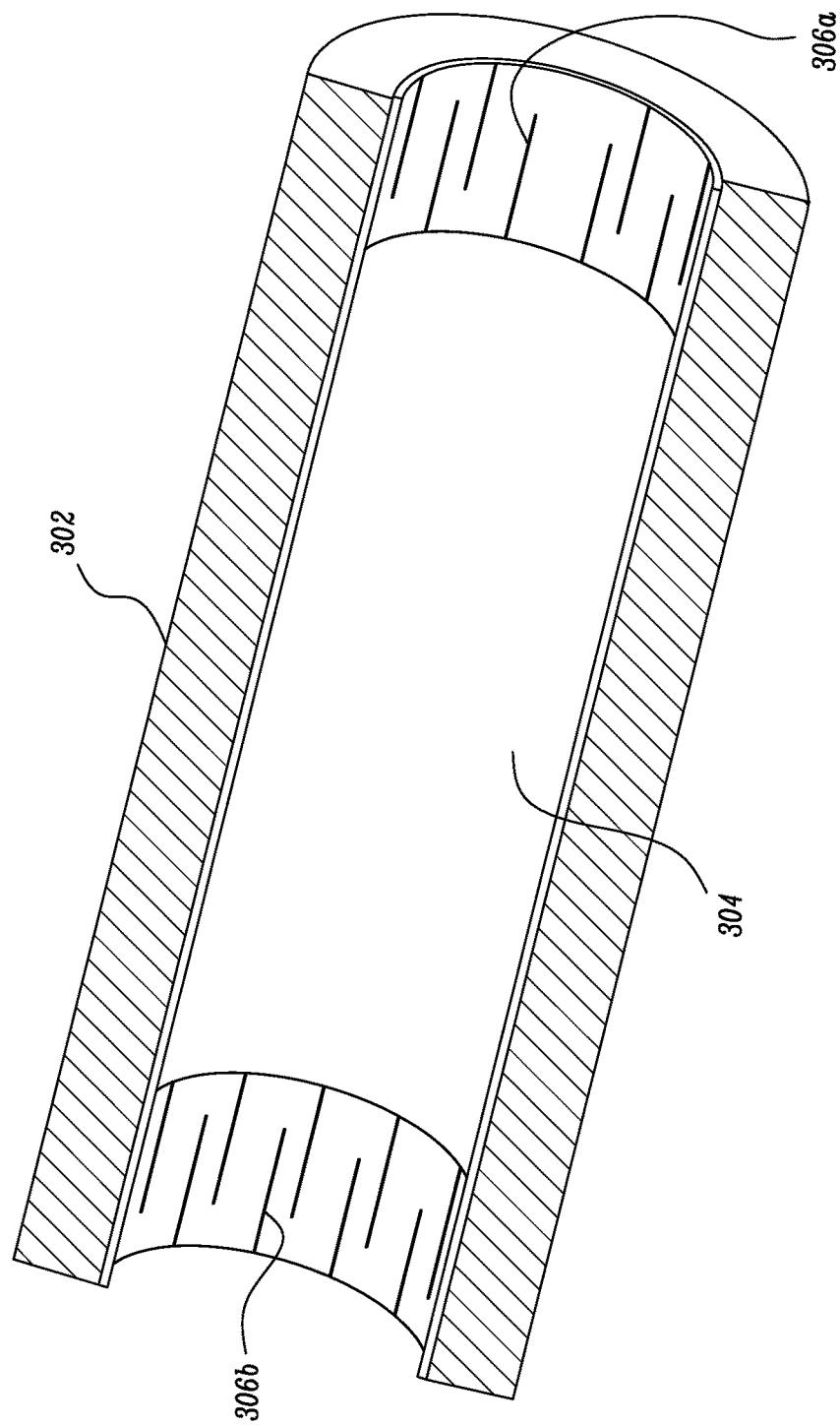
FIG. 4 is a sectional view of the pin of FIG. 3, in accordance with an embodiment of the present disclosure.

Referring to FIG. 4, the first and second flexible interdigital capacitive sensors 306a and 306b are disposed around the inner circumference of the chamber 304. The first and second flexible interdigital capacitive sensors 306a and 306b are circumferentially symmetric, such that their orientation upon insertion into the chamber 304 does not matter.

In an embodiment, the first and second flexible interdigital capacitive sensors 306a and 306b are made up of a flexible material, so that they can be folded in a circular form to form a tube or ring, and disposed inside the chamber 304.

In another embodiment, the first and second flexible interdigital capacitive sensors 306a and 306b are immersed either partially or fully within the fluid contained in the chamber 304.

One skilled in the art will appreciate that the first and second flexible interdigital capacitive sensors 306a and 306b are disposed at ends of the pin 302 so as to determine a correct value of the level of the fluid within the chamber 304 when the pin 302 is tilted with respect to gravity. In case of a tilted position of the pin 302, the fluid present within the chamber 304 redistributes such that the level of the fluid at one end of the pin 302 is higher than the other end of the pin 302. Therefore, the correct value of the level of the fluid is an average of the level of fluid at the ends of the pin 302. So, to calculate the correct value of the level of the fluid in the tilted position of the pin 302, an average of the values, such as the first and second capacitance or the first and the second discharge times is considered.

One skilled in the art will appreciate that the first and second flexible interdigital capacitive sensors 306a and 306b may be integrated with the pin 302 at a manufacturing stage of corresponding link assembly 114.

One skilled in the art will appreciate that the chamber 304 may include more than two flexible interdigital capacitive sensors without deviating from the spirit of the present disclosure. Numerous configurations of interdigital capacitive sensors within the chamber 304 can be contemplated by one skilled in the art to monitor a level of fluid contained therein. In an example, the chamber 304 may include three or more interdigital capacitive sensors, where two interdigital capacitive sensors are disposed at two ends, and a third interdigital capacitive sensor is disposed at a middle portion of the chamber 304. In another example, the chamber 304 may include four interdigital capacitive sensors in a spaced apart configuration.

With continued reference to FIG. 3, the fluid level monitoring system 300 further includes a controller 308 that is disposed in operative communication with the first and second flexible interdigital capacitive sensors 306a and 306b. The controller 308 may be connected to the first and second flexible interdigital capacitive sensors 306a and 306b either through a wired or a wireless connection. The controller 308 may determine the level of the fluid in the chamber 304 based on a signal corresponding to measure of parameters received from the first and second flexible interdigital capacitive sensors 306a and 306b. In an embodiment, the controller 308 calculates the level of the fluid based on an average of the measure of parameters.

In an embodiment, the controller 308 is configured to receive values of the first and second capacitances $C_{out1}$ and $C_{out2}$ from the first and second flexible interdigital capacitive sensors 306a and 306b, respectively. The first and second capacitances $C_{out1}$ and $C_{out2}$ may be measured by the use of an analog timing circuit with a signal frequency inversely proportional to their capacitances as known in the art. The controller 308 is configured to determine the level of the fluid in the chamber 304 based, at least in part, on an average of the first and second capacitances $C_{out1}$ and $C_{out2}$. The level of the fluid in the chamber 304 is proportional to an average value of the first and second capacitances $C_{out1}$ and $C_{out2}$ and is defined by the following equation:

Oil level $\alpha (C_{out1} + C_{out2})/2$

In an embodiment, the controller 308 is configured to receive values of the first and second discharge times, $t_{out1}$ and $t_{out2}$, from the first and second flexible interdigital capacitive sensors 306a and 306b, respectively. The controller 308 is configured to determine the level of the fluid in the chamber 304 based, at least in part, on an average of the first and second discharge times $t_{out1}$ and $t_{out2}$. The level of the fluid in the chamber 304 is proportional to an average value of the first and second discharge times $t_{out1}$ and $t_{out2}$ and is defined by the following equation:

Oil level $\alpha (t_{out1}$ and $t_{out2})/2$

In an embodiment, the first and the second flexible interdigital capacitive sensors 306a and 306b include suitable means known in the art to provide a measure of parameters, which are compensated for the dielectric constant of the fluid in the chamber 304. In an exemplary embodiment, each of the first and second flexible interdigital capacitive sensors 306a and 306b include more than one interdigital pattern. Each of the interdigital pattern capacitance may be dependent on both the level of the fluid and the dielectric constant of the fluid. However, as known in the art, combination of interdigital patterns capacitance and therefore capacitance or any other parameter of the first and the second flexible interdigital capacitive sensors 306a and 306b is dependent only on the level of the fluid in the chamber 304 and is independent of the dielectric constant of the fluid. Therefore, the first and the second flexible interdigital capacitive sensors 306a and 306b provide a measure of the parameters independent of the type of fluid present in the chamber 304. In an embodiment, the first and second capacitance $C_{out1}$ and $C_{out2}$ determined and transmitted to the controller 308 is independent of the type of fluid in the chamber 304. In an embodiment, the first and second discharge times, $t_{out1}$ and $t_{out2}$, determined and transmitted to the controller 308 is independent of the type of fluid in the chamber 304.

In an embodiment, the first and the second flexible interdigital capacitive sensors 306a and 306b may have more than one interdigital pattern with associated capacitances, for example, the first and second capacitances $C_{out1(1)}$ and $C_{out2(1)}$ for pattern (1) and the first and second capacitances $C_{out1(2)}$ and $C_{out2(2)}$ for pattern (2). The first and second capacitances $C_{out1(1)}$ and $C_{out2(1)}$ for pattern (1) and the first and second capacitances $C_{out1(2)}$ and $C_{out2(2)}$ for pattern (2) are determined and transmitted to the controller 308, based on which the controller 308 provides an estimate of the level of the fluid independent of the type of fluid in the chamber 304. Similarly, the first and second flexible interdigital capacitive sensors 306a and 306b may have more than one interdigital pattern with associated discharge times, for example, the first and second discharge times $t_{out1(1)}$ and $t_{out2(1)}$ for pattern (1) and the first and second discharge times $t_{out1(2)}$ and $t_{out2(2)}$ for pattern (2). The first and second discharge times $t_{out1(1)}$ and $t_{out2(1)}$ for pattern (1) and the first and second discharge times $t_{out1(2)}$ and $t_{out2(2)}$ for pattern (2) are determined and transmitted to the controller 308, based on which the controller 308 provides an estimate of the level of the fluid independent of the type of fluid present in the chamber 304.

Various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Figure 5:
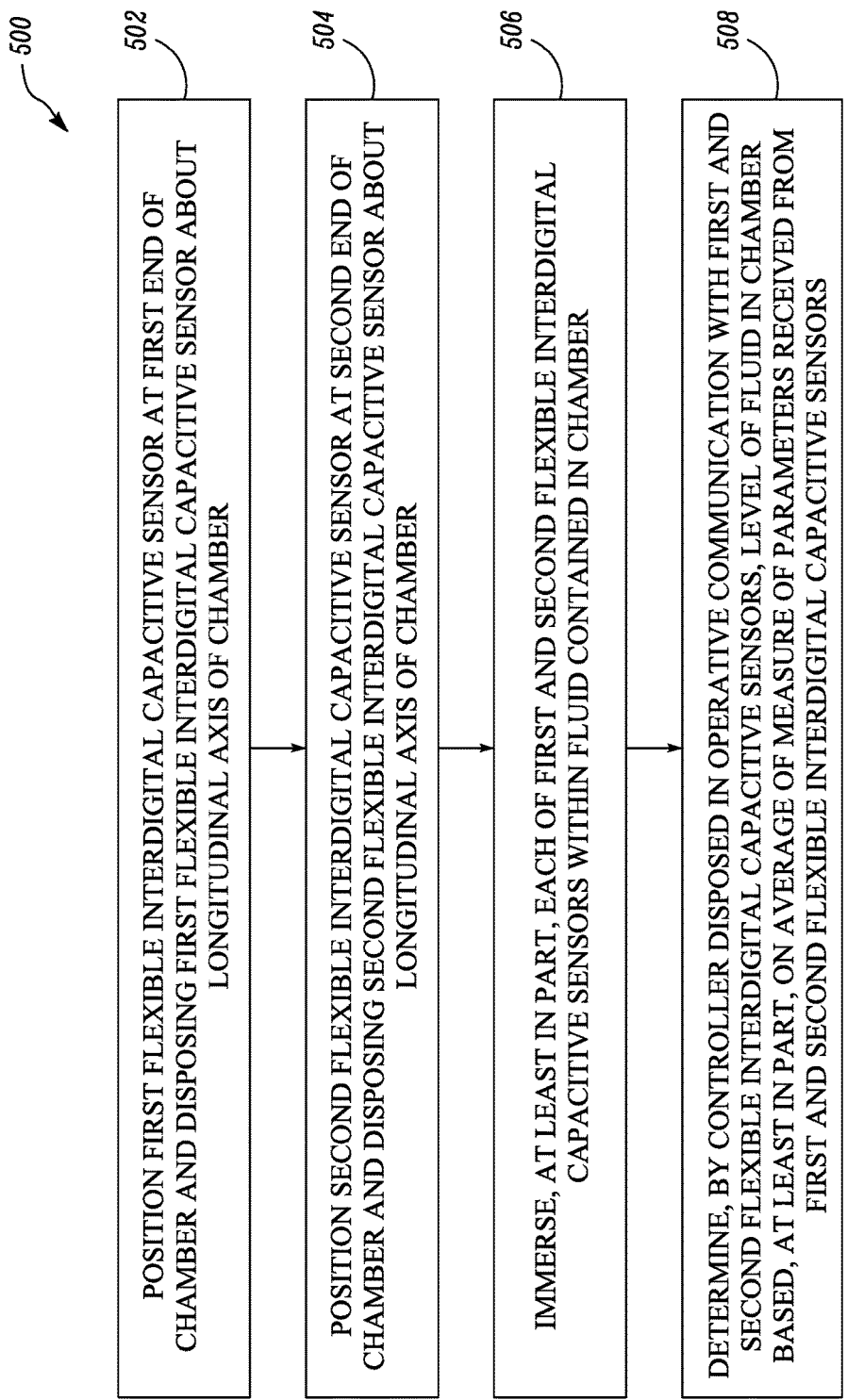
FIG. 5 is a flow chart depicting a method of monitoring fluid level in a pin of the link assembly, in accordance with an embodiment of the present disclosure.

FIG. 5 is a flowchart illustrating a method of monitoring a level of a fluid in the chamber of a pin of a link assembly. By way of example, a method 500 of FIG. 5 will hereinafter be explained in conjunction with FIGS. 2-4.

At block 502, the first flexible interdigital capacitive sensor 306a is positioned at the first end of the chamber 304, and disposed about a longitudinal axis of the chamber 304. Each of the first and second flexible interdigital capacitive sensors 306a and 306b are disposed around an inner circumference of the chamber 304.

At block 504, the second flexible interdigital capacitive sensor 306b is positioned at the second end of the chamber 304, and disposed about a longitudinal axis of the chamber 304.

At block 506, each of the first and second flexible interdigital capacitive sensors 306a and 306b are immersed at least in part, within a fluid contained in the chamber 304. In an example, when the chamber 304 is completely filled with fluid and the chamber 304 is in a horizontal position, both the first and the second flexible interdigital capacitive sensors 306a and 306b are immersed in the fluid. In another example, when the chamber 304 is in a tilted/inclined position, one of the first and second sensors 306a/306b may be completely immersed, while another of the first and second sensors 306a/306b may be partially immersed in the fluid.

At block 508, the controller 308 disposed in operative communication with the first and second flexible interdigital capacitive sensors 306a and 306b determines a level of the fluid in the chamber 304 based, at least in part, on an average of the measure of the parameters received from the first and second flexible interdigital capacitive sensors 306a and 306b. The measure of the parameters received from each of the first and second flexible interdigital capacitive sensors 306a and 306b are a function of the fluid level in the chamber 304. In an embodiment, the controller 308 determines the level of fluid in the chamber 304 based, at least in part, on a sensitivity of the first and second flexible interdigital capacitive sensors 306a and 306b which is dependent on various factors associated with a geometry and construction of the first and the second flexible interdigital capacitive sensors 306a and 306b including, but not limited to, a spacing between the comb-like electrodes of each of the flexible interdigital capacitive sensors 306a and 306b, material properties of the substrate used in forming each of the respective flexible interdigital capacitive sensors 306a and 306b, and the like.

Moreover, with implementation of embodiments disclosed herein, technicians can easily and quickly monitor the amount of oil in the link assembly 114 without intrusion into or destruction to the container defining the chamber 304. With use of embodiments disclosed herein, the technicians need not disassemble the undercarriage 100, or change the stopper 214 inside the fluid cavity 208 every time while taking the measurement. Since, the fluid level monitoring system 300 is integrated in the link assembly 114 itself, whole undercarriage 100 need not be removed from the vehicle for undercarriage track joint validation. Moreover, the first and the second flexible interdigital capacitive sensors 306a and 306b used in the fluid level monitoring system 300 are low cost, low power, reliable, linear, and easy to use. The controller 308 enables transmission of monitoring data from the measurement location efficiently and facilitates remote monitoring thereof. The fluid level monitoring system 300 is robust, reliable, has good performance as there are no moving parts therein. Such a configuration could allow one skilled in the art to conveniently retro-fit the fluid level monitoring system 300 onto existing link assemblies.

While aspects of the present disclosure have been particularly shown and described with reference to the embodiments above, it will be understood by those skilled in the art that various additional embodiments may be contemplated by the modification of the disclosed machines, systems, methods and processes without departing from the spirit and scope of what is disclosed. Such embodiments should be understood to fall within the scope of the present disclosure as determined based upon the claims and any equivalents thereof.

What is claimed is:

1. A fluid level monitoring system for a container defining a chamber, the chamber having first and second ends located distally from one another, the fluid level monitoring system comprising:
   a first flexible interdigital capacitive sensor located at the first end of the chamber and disposed about a longitudinal axis of the chamber;
   a second flexible interdigital capacitive sensor located at the second end of the chamber and disposed about the longitudinal axis of the chamber, wherein the first and the second flexible interdigital capacitive sensors are configured to be immersed, at least in part, within a fluid contained in the chamber; and
   a controller disposed in operative communication with the first and the second flexible interdigital capacitive sensors, the controller being configured to determine a level of the fluid in the chamber based, at least in part, on an average of measure of parameters received from the first and the second flexible interdigital capacitive sensors.

2. The fluid level monitoring system of claim 1, wherein the container is a pin of a track joint assembly, the track joint assembly having at least two links offset with one another and rotatably supported by the pin, the chamber being located within a body of the pin and configured to exhibit a tubular shape.

3. The fluid level monitoring system of claim 1, wherein measure of the parameters received from the first and the second flexible interdigital capacitive sensors is a function of the level of the fluid in the chamber.

4. The fluid level monitoring system of claim 1, wherein the parameters are capacitances of the first and the second flexible interdigital capacitive sensors.

5. The fluid level monitoring system of claim 1, wherein the parameters are discharge times of the first and the second flexible interdigital capacitive sensors from a first voltage to a second voltage.

6. The fluid level monitoring system of claim 1, wherein the first flexible interdigital capacitive sensor is disposed around an inner circumference of the chamber.

7. The fluid level monitoring system of claim 1, wherein the second flexible interdigital capacitive sensor is disposed around an inner circumference of the chamber.

8. The fluid level monitoring system of claim 1, wherein the first and the second flexible interdigital capacitive sensors are configured to be compensated for a dielectric constant of the fluid in the chamber.

9. The fluid level monitoring system of claim 1, wherein each of the first and the second flexible interdigital capacitive sensors includes at least three electrodes thereon.

10. A pin of a track joint assembly having at least two links offset with one another and rotatably supported by the pin to facilitate co-operative movement of the links relative to one another, the pin comprising:
   a body having an inner circumference defining a chamber therein, the chamber configured to define a first end and a second end located distally from the first end; and
   a fluid level monitoring system associated with the chamber, the fluid level monitoring system comprising:
      a first flexible interdigital capacitive sensor located at the first end of the chamber and disposed about a longitudinal axis of the chamber;
      a second flexible interdigital capacitive sensor located at the second end of the chamber and disposed about the longitudinal axis of the chamber, wherein the first and the second flexible interdigital capacitive sensors are configured to be immersed, at least in part, within a fluid contained in the chamber; and
      a controller disposed in operative communication with the first and the second flexible interdigital capacitive sensors, the controller being configured to determine a level of the fluid in the chamber based, at least in part, on an average of measure of parameters received from the first and the second flexible interdigital capacitive sensors, wherein measure of the parameters received from respective ones of the first and the second flexible interdigital capacitive sensors is independent of a dielectric constant associated with the fluid contained in the chamber and a tilt angle of the chamber with respect to gravity.

11. The pin of claim 10, wherein measure of parameters received from the first and the second flexible interdigital capacitive sensors is a function of the level of the fluid in the chamber.

12. The pin of claim 10, wherein each of the first and the second flexible interdigital capacitive sensors is disposed around the inner circumference of the chamber.

13. The pin of claim 10, wherein the first and the second flexible interdigital capacitive sensors are compensated for the dielectric constant of the fluid present in the chamber.

* * * * *